United States Patent [19]

Bowen et al.

[11] Patent Number: 5,200,590
[45] Date of Patent: Apr. 6, 1993

[54] APPARATUS AND METHOD FOR MAKING MICROWAVE POPCORN

[75] Inventors: Robert F. Bowen, Burlington; Robert J. Castoldi, Newton; John S. Sklenak, Sudbury, all of Mass.

[73] Assignee: Raytheon Company, Lexington, Mass.

[21] Appl. No.: 803,257

[22] Filed: Dec. 5, 1991

[51] Int. Cl.$^5$ .................. H05B 6/80; B65D 77/02
[52] U.S. Cl. ................. 219/10.55 E; 219/10.55 F; 219/10.55 M; 99/DIG. 14; 426/107; 426/113; 426/234; 426/243
[58] Field of Search ........... 219/10.55 E, 10.55 M, 219/10.55 F; 426/107, 110, 113, 234, 243, 118; 99/DIG. 14; 383/120

[56] References Cited

U.S. PATENT DOCUMENTS

| | | | |
|---|---|---|---|
| 2,939,379 | 6/1960 | Schmitt | 99/238.4 |
| 4,038,425 | 7/1977 | Brandberg et al. | 426/107 |
| 4,158,760 | 6/1979 | Bowen et al. | 219/10.55 E |
| 4,361,235 | 11/1982 | Gautier | 426/110 |
| 4,477,705 | 10/1984 | Danley et al. | 219/10.55 E |
| 4,532,397 | 7/1985 | McClelland | 219/10.55 E |
| 4,571,337 | 2/1986 | Cage et al. | 426/107 |
| 4,584,202 | 4/1986 | Roccaforte | 426/107 |
| 4,586,649 | 5/1986 | Webinger | 426/113 |
| 4,864,090 | 9/1989 | Maxwell et al. | 426/107 |
| 4,873,406 | 10/1989 | Connor | 219/10.55 E |
| 5,011,299 | 4/1991 | Black, Jr. et al. | 426/107 |
| 5,045,659 | 9/1991 | Wolfe et al. | 219/10.55 E |
| 5,061,500 | 10/1991 | Mendenhall | 426/107 |

*Primary Examiner*—Bruce A. Reynolds
*Assistant Examiner*—Tuan Vinh To
*Attorney, Agent, or Firm*—William R. Clark; Richard M. Sharkansky

[57] ABSTRACT

Apparatus and method for popping high yield popcorn using a bag having a substantially rectangular cross section as manufactured using a conventional bag machine. A base supports the bag on edge with at least one joining panel being inclined such as, for example, at 45°. Whether the bag is initially unfolded or unfolds as a result of internal pressure caused by some kernels popping, a horizontal elongated V-shaped trough is formed as the lower-most region of the bag due to the supporting orientation of the base. Kernels form in a clump in the nadir of the trough thereby enhancing the yield of the popping, and kernels disturbed from the clump by popping kernels are directed back to the clump by the inclined walls of the bag.

19 Claims, 5 Drawing Sheets

U.S. Patent    Apr. 6, 1993    Sheet 1 of 5    5,200,590

APPARATUS AND METHOD FOR MAKING MICROWAVE POPCORN

BACKGROUND OF THE INVENTION

The field of the invention generally relates to apparatus and method for popping popcorn in a microwave oven, and more particularly relates to a disposable popcorn package and a method of supporting such package during popping.

As is well known in the microwave heating art, popcorn is a relatively non-lossy substance primarily due to its low water content and small size. More particularly, if dry popcorn kernels are placed on a flat plate and exposed to microwave energy in a microwave oven, only a relatively small percentage of the kernels will pop within a reasonable time period because man of the kernels will not absorb microwave energy rapidly enough to reach a popping temperature. Further, if the time period is extended, kernels that have already popped will scorch.

U.S. Pat. Nos. 4,158,760 and 4,586,649, both of which are assigned to the same assignee as the present invention, describe apparatus and method for forming the unpopped kernels into a clump. It was found that clumping greatly increases the popping yield (i.e. percentage of popped kernels) because, among other things, heat losses from kernels are absorbed by adjacent kernels such that the overall temperature of the entire clump is higher than if the kernels were spaced from each other. In particular, a container such as a plastic conical bowl has a lower region of restricted internal volume which forms the kernels into a clump. Then, even after unpopped kernels are disturbed from the clump by other kernels popping, the inclined walls of the cone direct the unpopped kernels by gravity back to the clump.

U.S. Pat. No. 5,045,659, which is assigned to the same assignee, describes a disposable microwave container or package that relies on the above-described principle of clumping to obtain high yield popping. In particular, the container is initially can-shaped and when the kernels pop, a plurality of downwardly converging verticals folds open up or fan out to form a cone-shaped container. One drawback of this arrangement, however, is that the container cannot be manufactured using conventional microwave popcorn bag machines.

One commercially available disposable popcorn package uses a bag of substantially rectangular cross-section that has an inner vapor and grease barrier layer, an intermediate layer with a susceptor or microwave absorber applied thereto, and an outer paper layer on which the instructions and other information are printed. The bag has inwardly pleated side panels and is initially flat with ends folded over to provide a compact package for shipping and storage. In use, the bag is placed in the microwave oven with the ends projecting upwardly, and then microwave energy is applied. The heating of the kernels by absorption o microwave energy is assisted by heat conducted from the microwave susceptor which also heats in response to the microwave energy. In such manner, a relatively large percentage of the kernels reach popping temperature within a reasonable period of time, thereby preventing scorching of already popped kernels. One problem with such package is that the microwave susceptor, for example may be a conductive film, substantially increases the cost of the package.

Another commercially available microwave popcorn package uses a folded bag similar to the above-described susceptor bag except that rather than using a susceptor layer, the kernels are coated with or embedded in grease, oil, or a similar cooking agent which is lossy. Thus, relatively high yield is attained by a boost in kernel temperature coming from the grease rather than the susceptor film in the package. One problem with such arrangement is that the dietary restrictions or preferences of some consumers prohibit the use of grease or other oils. Also, some consumers may want to apply a particular seasoning of preference rather than the grease or oil supplied by the manufacturer.

SUMMARY OF THE INVENTION

It is an object of the present invention to provide a disposable popcorn package that can be manufactured with a conventional bag machine.

It is a further object to use a disposable popcorn package or bag having a substantially rectangular cross section. That is, it is an object to use a bag that has four substantially flat side panels that are disposed at right angles.

It is a further object to provide a disposable popcorn package that produces high yield popping without the use of a microwave susceptor in the package.

It is a further object to provide a disposable popcorn package that produces high yield popping within a reasonable period of time without the use of grease, oil, or other microwave lossy coating on the kernels to enhance the absorbtivity of the kernels.

In accordance with the invention, apparatus is provided for popping popcorn in a microwave oven, comprising a microwave transparent foldable package holding popcorn kernels, the package having a bottom panel and four side panels each joined to the bottom panel and adjacent ones of the side panels along edges wherein, in an unfolded state of the package, regions of restricted volume are formed along and adjacent the edges between respective joining ones of the side and bottom panels. For example, with a package of substantially rectangular cross section and a flat bottom, trough-like regions are formed between each of the joining side panels and between each side panel and the bottom. Means are also provided for supporting the package on one of the edges with the respective joining panels of the one edge being inclined to form one of the regions of restricted volume as the lower-most portion of the package. By such arrangement, the kernels clump in the lower-most region and, as the kernels begin to pop by microwave heating, unpopped kernels disturbed from the clump by popping kernels are directed back to the lower-most region by the inclined panels. Preferably, the side panels are sealed at the top and the package is initially folded wherein, as the kernels are heated by microwave energy and pop, internal package pressure generated by the popping kernels causes the package to unfold. In one preferred arrangement, the inclined joining panels are both side panels. In another arrangement, one of the inclined joining panels is a side panel and the other is the bottom panel. It may also be preferable that two opposing ones of the side panels be inwardly pleated panels. Also, the supporting means may comprise a base having a V-shaped notch in which the package is seated.

With such arrangement, the kernel clumping principle can be applied in a package readily manufactured using conventional bag machines, and high yield popping such as, for example, above 80 or 85% can be attained without the use of a microwave susceptor or coating the kernels with a lossy substance such as grease or oil. Therefore, a relatively inexpensive package provides high yield popcorn with a low calorie count. The bag is supported on one edge, and whether the bag is initially unfolded or unfolds as a result of internal pressure created during popping, a horizontal trough-like or V-shaped region of restricted volume is formed at the lower-most region of the bag, and the clumping principle is attained. That is, the kernels heat faster using microwave energy because they are in a clump, and unpopped kernels disturbed from the clump by popping kernels are returned to the clump because the walls or side panels of the bag slope inwardly to form the trough or trough-like region. Further, the trough can be formed between two side panels, or one side panel and the bottom if the bottom is substantially flat and substantially perpendicular to the side panels. The angle of the trough may be referred to as a dihedral angle which is an angle between two intersecting planes here defined as side or bottom panels even though such panels may be slightly puffed outwardly so as not to form perfect planes.

The invention can also be practiced by a method of popping popcorn in a microwave oven, comprising the steps of placing popcorn kernels in a package having a bottom and four side panels each joined with adjacent ones of the side panels along edges, the container having a substantially rectangular cross section wherein joining side panels form trough-like regions along the edges, sealing the package, supporting the package on one of the edges to form the kernels into a clump along the one edge, irradiating the package with microwave energy to heat and thereby pop the kernels, and maintaining one of the trough-like regions as the lower-most portion of the bag to direct unpopped kernel disturbed from the clump by popping kernels back to the clump.

BRIEF DESCRIPTION OF THE DRAWINGS

The foregoing objects and advantages will be more fully understood by reading the description of the preferred embodiment with reference to the drawings wherein.

DESCRIPTION OF THE PREFERRED EMBODIMENTS

Figure 1:
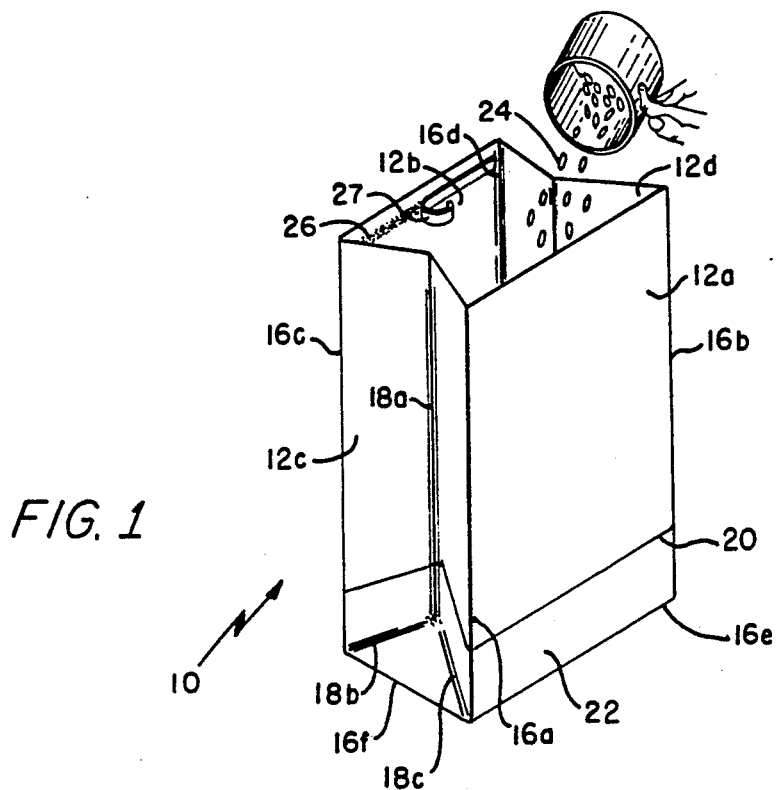
FIG. 1 is a perspective view of a bag being loaded with a charge of popcorn kernels.
Figure 2:
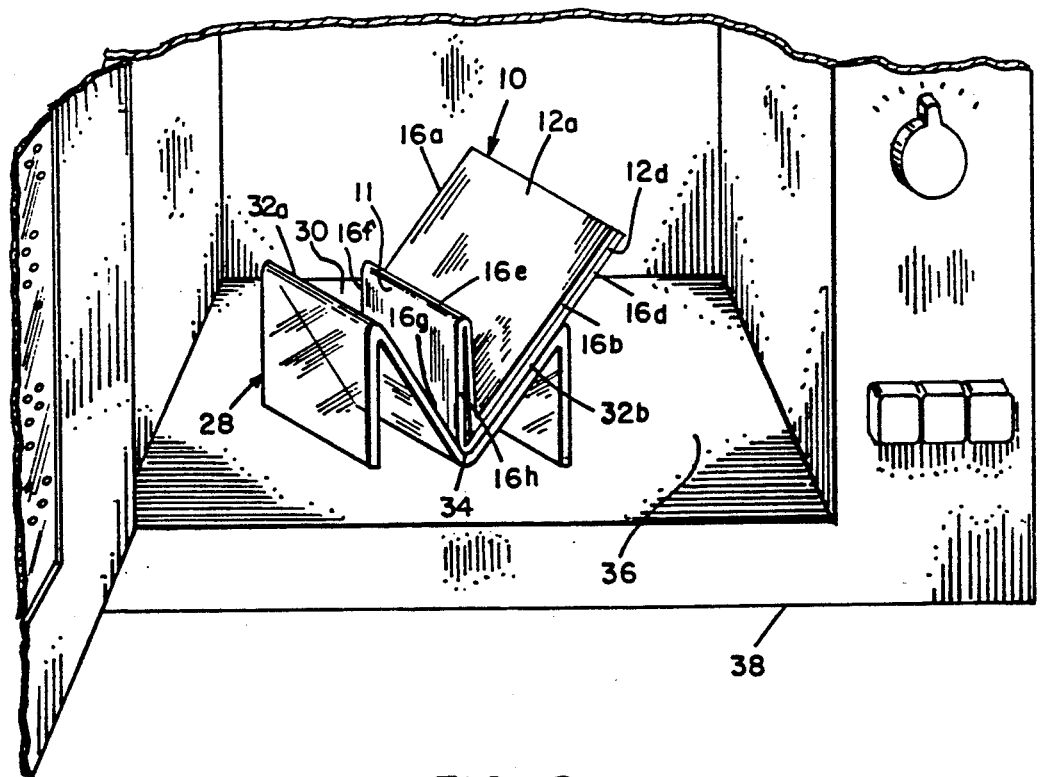
FIG. 2 is the bag of FIG. 1 supported on one of its edges by a base with the bag oriented at an inclined angle.

Referring to FIG. 1, a generally rectangular bag 10 or package is here shown to include a bottom 11 (FIG. 2) and four side panels 12a-d. Side panels 12a and b are two opposing generally rectangular face panels, and side panels 12c and d are two opposing generally rectangular inward pleated. As is well known, such bags 10 are readily and inexpensively manufactured by existing bag-making machines, and are widely sold as so-called "lunch bags". Face panel 12a is joined to pleated panels 12c and d along respective edges 16a and b, and face panel 12b is joined to pleated side panels 12c and d along respective edges 16c and 16d. Further, each of the panels 12a-d is joined to bottom panel 11 along bottom edges 16e-h (FIG. 2). The inward pleats 18a-c or fold lines permit the bags 10 to be folded to a compact form for sale and distribution. In particular, face panel 12a has a horizontal fold line 20, and the lower portion 22 of bag 10 is folded upwardly as pleats 18a-c are folded inwardly thereby providing a relatively flat or compactly folded bag 10 as shown best in FIG. 2.

Still referring to FIG. 1, a measured charge or quantity of popcorn kernels 24 are poured into bag 10, and then the upper or open end of bag 10 is sealed. More particularly, an adhesive strip 26 is here provided, and can be activated by either moistening or peeling off an upper protective strip 27. In any case, the top of bag 10 is sealed so as to retain the kernels 24 during popping, and also to permit a buildup of internal pressure which inflates or unfolds bag 10. Bag 10 may be a conventional paper bag, or more preferably, may be made from one or more layers that provide a vapor and/or grease barrier For example, bag may paper with a polyester laminate.

Figure 3:
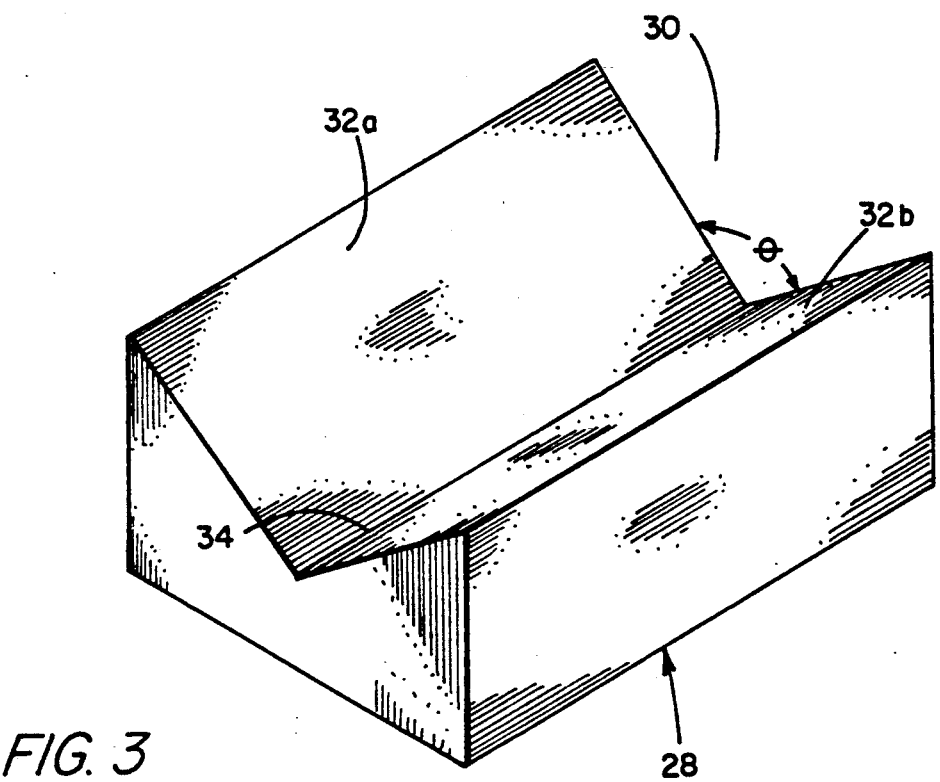
FIG. 3 is an alternate embodiment of the base.

Referring to FIG. 2, bag 10 is placed on a microwave transparent support 28 or base having a generally V-shaped notch 30 or trough. Support 28 may be a durable fixture that can be used over and over again, or alternately, as described later herein, support 28 may be cardboard box with a V-shaped cutout in which case, support 28 would be discarded after one or several uses. Referring also to FIG. 3 which shows an alternate form of support or base 28, notch 30 has two opposing sides 32a and 32b which may define planes or merely edge portions of a box, and are spaced apart by a predetermined angle e such as, for example, 90°. In such case, sides 32a and b would each be inclined 45° from horizontal. In FIG. 2, bag 10 is shown in a folded state or condition with face panel 12b resting or being supported on side 32b of notch 30. In an alternate arrangement, bag 10 could be placed in the same manner in notch 30, only with the bag unfolded such that bottom 11 also rests against side 32a of notch 30. As shown, edge 16g is supported at the nadir 34 of notch 30. As will become apparent, however, bag 10 could also be positioned with face panel 12b resting against side 32b of notch 30 and edge 16d resting against the nadir 34 of notch 30. In other words, bag 10, which is here shown with a flat bottom, can be supported upright or on its side so long as face panel 12b is oriented on the incline of side 32b and an edge 16g, 16c, or 16d is resting against nadir 34.

Still referring to FIG. 2, it is apparent that gravity will cause popcorn kernels 24 to form in a clump within a lower region of bag 10 along the nadir 34 of notch 30. In particular, the kernels 24 will congregate together such that kernels 24 will be in physical contact with other kernels 24. As shown, support 28 and bag 10 are positioned in the cavity 36 of microwave oven 38 which is then activated for a predetermined time period such as, for example, three to five minutes. As described in U.S. Pat. No. 4,158,760, which is hereby incorporated by reference, popcorn kernels which are clumped pop with a much higher yield (i.e. percentage of popped kernels) than kernals spaced from one another, and the yield is sufficiently high that the kernels can be popped without the use of oils or greases, or auxiliary microwave absorbing materials. More specifically, it has been found that popcorn kernels 24 in a clump rise to a popping temperature much more quickly and effectively than if the kernels are physically isolated from each other. It is believed that this clumping technique causes high yield because there is more efficient absorption of microwave energy due to the increased effective cross section of the clump, and the fact that heat radiated away from most kernels is absorbed by other kernels thus increasing the overall or cumulative temperature of the kernels in the clump.

Figure 4:
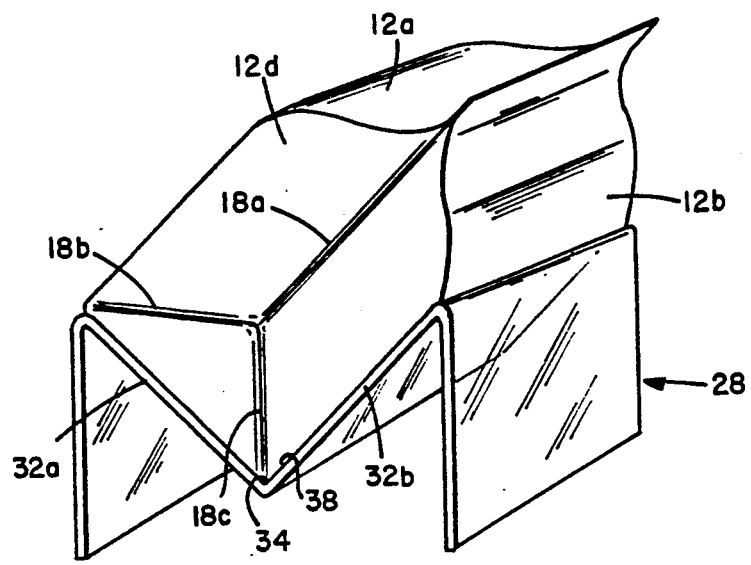
FIG. 4 is the bag after the kernels pop.

Referring to FIG. 4, there is shown a view of bag 10 after some or most of popcorn kernels 24 have popped. Assuming that bag 10 initially started in a folded condition as shown in FIG. 2, internal pressure within bag 10 builds up as a result of steam released from the popped kernels, and also from the increased volume of popped kernels. This internal pressure is retained within bag 10 as a result of the seal of adhesive 26, thereby inflating or unfolding bag 10 to the state shown in FIG. 4. It is preferable that the seal partially release at some predetermined pressure so as to avoid an explosion of bag 10. If bag 10 had not been folded after pouring in kernels 24 as shown in FIG. 2, then bag 10 would be in the unfolded state of FIG. 4 at the commencement of microwave exposure.

Figure 5:
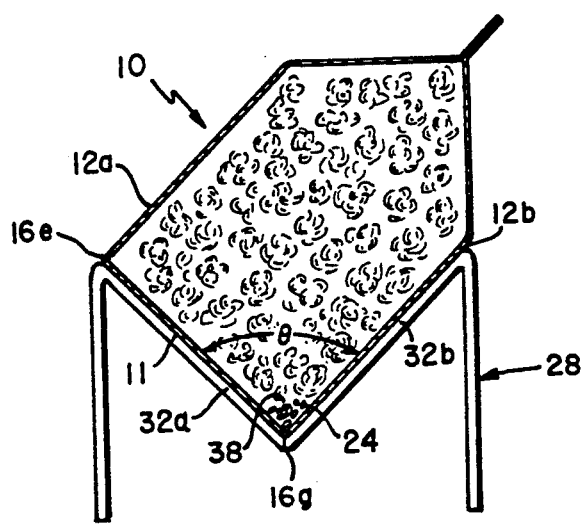
FIG. 5 is a sectioned view of FIG. 4.
Figure 6:
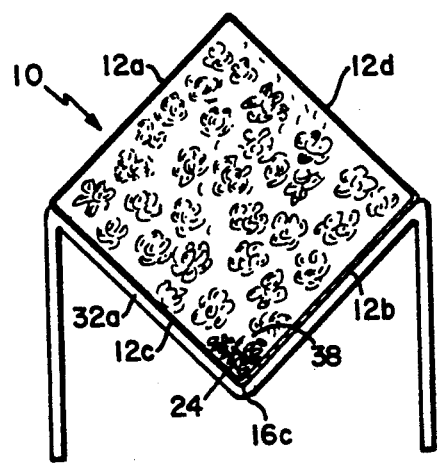
FIG. 6 is a sectioned view of an alternate arrangement of supporting the bag with one of the side edges along the nadir of the base.

Referring to FIG. 5, a sectional view of bag 10 shows a horizontal trough or trough-like region 38 of restricted volume is formed along and proximate edge 16 g between face panel 12b and bottom 11. More particularly, as bag 10 inflates, bottom 11 fans out and a dihedral angle $\theta$ is formed between the planes defined by face panel 12b and bottom panel 11. Here, the dihedral angle is shown to be approximately 90° with face panel 12b and bottom 11 each being inclined approximately 45° to form trough 38. Unpopped kernels 24 that are disturbed from the clump by the popping or explosion of other kernels are under the influence of gravity, and are directed by inclined panels 12b and 11 back to the lower-most region 38 of restricted volume within bag 10 along the nadir 34 of notch 30. Thus, the clump is retained in the lower most region of bag 10 notwithstanding the popping of some kernels, and therefore effective and efficient popping is produced throughout the microwave activation. Similarly, if bag 10 had been oriented with edge 16c or 16d against the nadir 34 of notch 30 and face panel 12b along side 32b of notch 30, bag 10 would have inflated and clumping would have been maintained in a trough-like region 38 of restricted volume along edge 16c or 16d as shown in FIG. 6. Thus, it is apparent that by supporting a bag 10 of substantially rectangular cross-section on edge with side and or bottom panels 12a-d or 11 inclined therefrom such that a trough-like region 38 is formed along the underside, the clumping technique can be practiced. Generally, base 28 functions as a stand to support bag 10 on edge with the joining panels being inclined to form a V-shaped trough as the lower-most region of bag 10. Thus, without the use of grease or auxiliary microwave absorbing bodies, popcorn can be popped with relatively high yield in a bag or package that is made using a conventional type bag machine.

Figure 8:
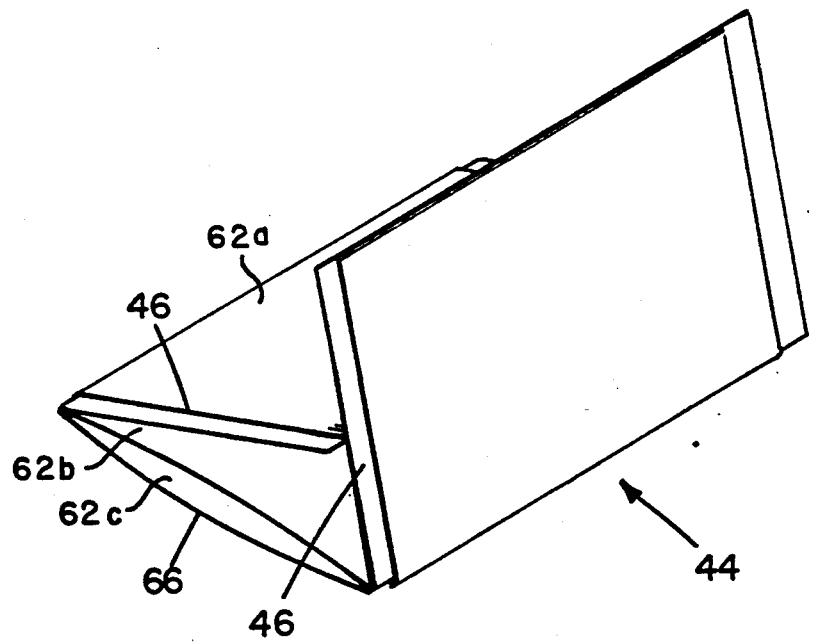
FIG. 8 is a perspective view of one of the disposable packages purchased in a carton.
Figure 7:
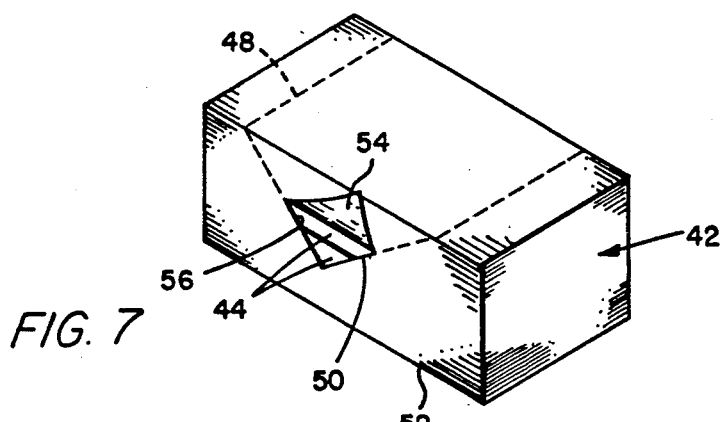
FIG. 7 is an alternate embodiment of the base as formed by removing a cut-out portion of the carton in which disposable packages are purchased.
Figure 11:
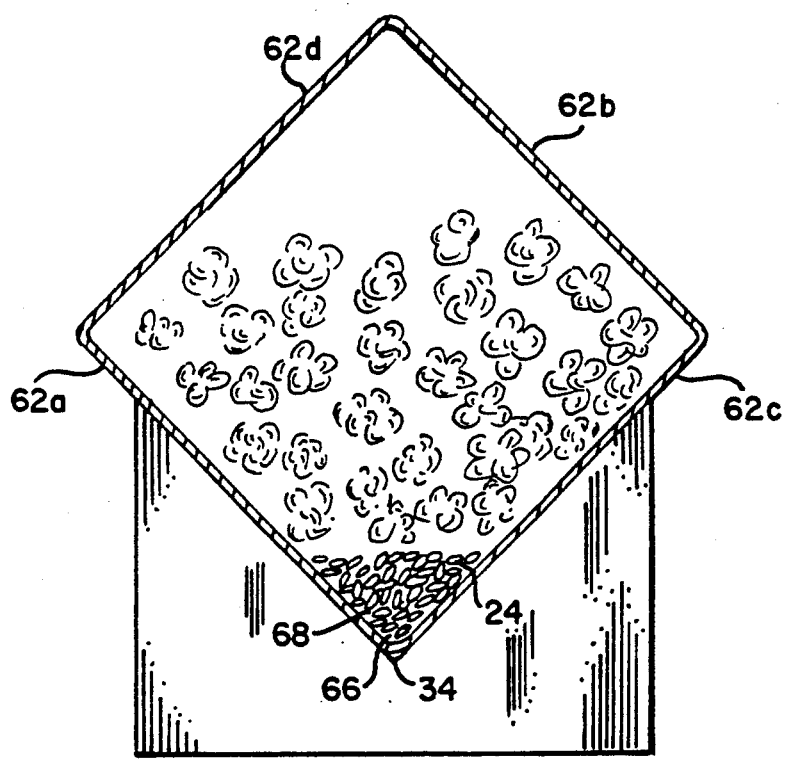
FIG. 11 is a sectioned view of FIG. 10.

Referring to FIG. 7, an alternate embodiment is here shown as a carton 42 encasing several disposable microwave popcorn packages 44. With reference to FIG. 8, conventional shaped package 44 may generally be a folded bag having face panels 62a and b and pleated side panels 62c and d (FIG. 11) which unfolds to form a substantially rectangular cross section. Conventionally, package 44 has two inwardly folded legs 46 to render the packages 44 and carton 42 more compact or smaller in size. Unlike commercially available popcorn packages, however, package 44 here does not have, or at least does not require having, a layer of microwave absorbing material or susceptor. Also, the kernels 24 in package 44 do not have, or at least do not require having, a coating of grease or oil as an alternative to a susceptor layer in order to enhance microwave lossiness. Rather, as shown, carton 42 or box has perforations 48 patterned in a manner such that a notch 50 can be cut out of cardboard carton 42. Thus the carton 42 that the packages 44 come in can be used to construct a support 52 or base that stands a package 44 on edge so that the heretofore clumping principle can be practiced. In particular, the flap 54 within perforations 48 can be removed there leaving a cut-out with inclined V-shaped edges 56 to support package 44 on edge or at an incline in a manner to be described. While the used package 44 would be disposed, the carton 42 would be retained for subsequent use for supporting the other packages 44 of the carto 42 until all such packages 44 have been used.

Figure 9:
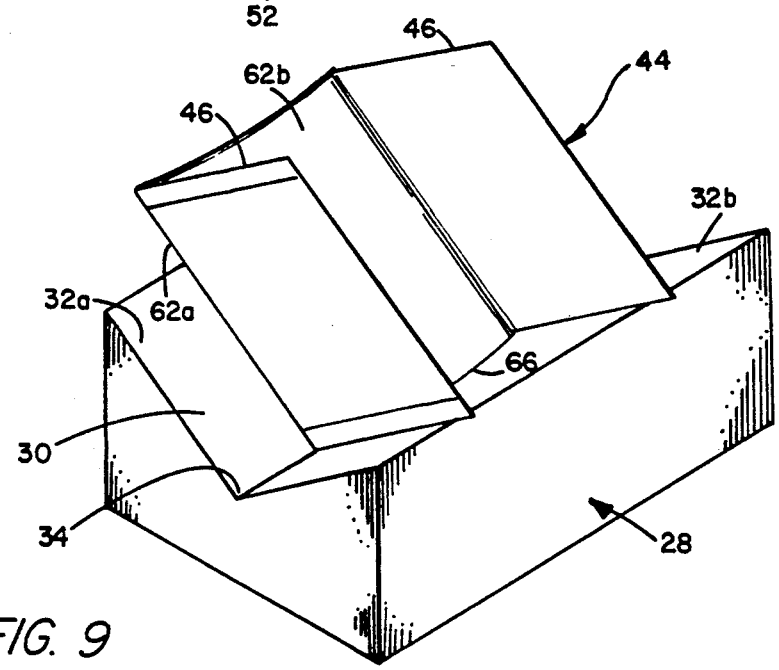
FIG. 9 is a perspective view of one of the disposable popcorn packages supported on a base.

In use, package 44 is seated in notch 50 of carton 42 or, as shown in FIG. 9, may be positioned in notch 30 of a permanent fixture base 28 as shown in FIG. 3 such that side panel 62a rests against inclined side 32a and edge 66 seats in the nadir 34 of notch 30. As shown, legs 46 face generally upwardly.

Figure 10:
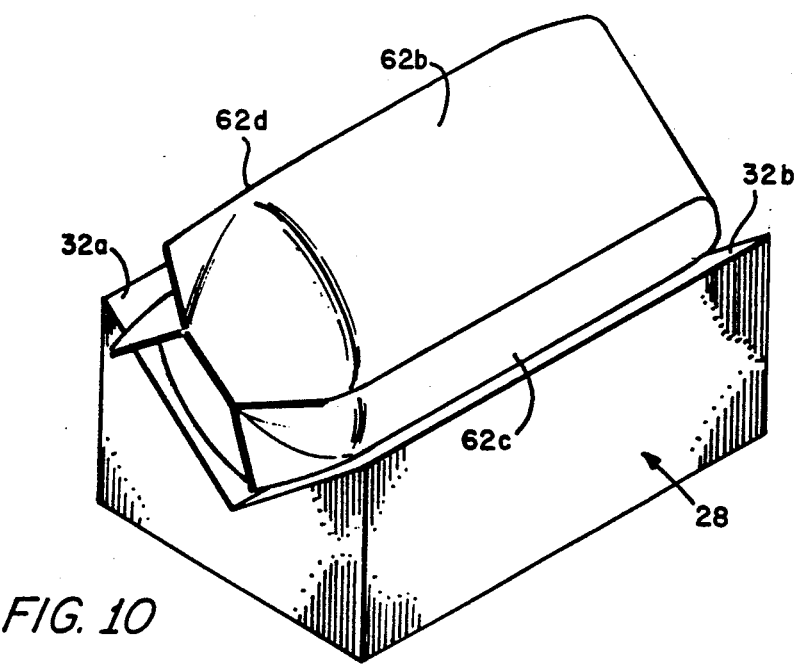
FIG. 10 is a view of the disposable popcorn package of FIG. 9 after popping.

Referring to FIG. 10, package 44, in a manner similar to bag 10, unfolds as internal pressure of the sealed package 44 is produced by steam and the increased volume of popped kernels. Thus, as shown best in the sectioned view of FIG. 11, a trough-like region 68 is formed along the nadir 34 of notch 30, and the lower most region 68 of package 44 has a restricted volume for practicing the clumping technique.

In the described embodiments of bag 10 and package 44, kernel clumping is attained in a substantially 90° dihedral angle $\theta$ between two adjacent side panels (e.g. face panels and pleated panels) or, in the case of bag 10 when bottom 11 is flat, between a side panel and bottom 11. As described in U.S. Pat. No. 4,158,760, the most preferable angle $\theta$ for clumping in a cone has generally found to be approximately 70°. Therefore, although greatly enhanced yield can be attained by using a 90° dihedral as described herein, it may be desirable to use a bottom 11 that is for example, a parallelogram with a 70° angle such that the dihedral angle forming the trough-like region 38 of restricted volume is 70°.

In summary, disposable bags or packages 10 or 44 can be made using conventional bag machines. Examples are lunch bag types as shown in FIG. 1 and commercially available bifold popcorn bags as shown in FIG. 8. The bags or packages 10 or 44 are such that in an unfolded state, panels are substantially planar (although they can be somewhat bowed or puffed outwardly) and are joined along edges forming elongated trough-like or V-shaped regions of restricted volume. In accordance with the invention, the bag 10 or package 44 is supported on edge in such manner that when the bag 10 or 44 unfolds or inflates, the panels joining the lower most edge are inclined to provide clumping of kernels 34 in the lower most trough-like region 38 or 68. In such manner, high yield popcorn can be attained in substantially rectangular bags made from conventional bag machines. For example, yields above 80% or 85% can readily be attained in such bags without the use of a susceptor layer or grease.

This concludes the description of the preferred embodiment. However, a reading of it will bring to mind many modifications and alterations that do not depart from the spirit and scope of the invention. Accordingly, it is intended that the scope of the invention be limited only by the appended claims.

What is claimed is:

1. Apparatus for popping popcorn in a microwave oven, comprising:
    a microwave transparent foldable package holding popcorn kernels, said package having a bottom panel and four side panels each joined to said bottom panel and adjacent ones of said side panels along edges wherein, in an unfolded state of said package, regions of restricted volume are formed along and adjacent said edges between respective joining ones of said side and bottom panels; and
    means for supporting said package on one of said edges to position the corresponding one of said regions of restricted volume as the lower most region of said package with the respective joining panels of said one edge being inclined wherein said kernels clump in said lower-most region and, as said kernels begin to pop by microwave heating, unpopped kernels disturbed from said clump by popping kernels are directed back to said lower-most region by said inclined panels.

2. The apparatus recited in claim 1 wherein said side panels are sealed at the top and said package is folded wherein, as said kernels are heated by microwave energy and pop, internal package pressure generated by said popping kernels causes said package to unfold.

3. The apparatus recited in claim 1 wherein said inclined joining panels of said one edge are side panels.

4. The apparatus recited in claim 1 wherein said inclined joining panels of said one edge are a side panel and said bottom panel.

5. The apparatus recited in claim 1 wherein two opposing ones of said side panels are inwardly pleated panels.

6. The apparatus recited in claim 1 wherein said supporting means comprises a base having a V-shaped notch.

7. The apparatus recited in claim 6 wherein said package rests in said V-shaped notch.

8. Apparatus for popping popcorn in a microwave oven, comprising:
    a foldable bag having a bottom and four side panels each joined to adjacent ones of said side panels wherein said bag has a substantially rectangular cross section in an unfolded state, said bag being sealed and holding a change of popcorn kernels; and
    means for standing said bag on one of said edges with the panels joined at said one edge being inclined to form a V-shaped trough as the lower-most region of said bag wherein said kernels form in a clump in said trough and unpopped kernels disturbed from said clump by the popping of other kernels due to microwave heating return to the clump.

9. Apparatus for popping popcorn in a microwave oven, comprising:
    a microwave transparent foldable bag having a bottom and four side panels each joined to adjacent ones of said side panels along edges wherein, when said bag is unfolded, trough-like regions of restricted volume are formed in said bag along said edges in the dihedral angles between respective joining ones of said side panels; and
    means for supporting said bag on one of said edges to position the corresponding one of said trough-like regions horizontally as the lower-most region of said bag wherein kernels form in a clump in said lower most trough-like region of restricted volume and, unpopped kernels disturbed from said clump by other kernels popping due to microwave heating are directed back to the clump.

10. The apparatus recited in claim 9 wherein said bag comprises means for sealing said bag to unfold by internal pressure as said kernels pop.

11. The apparatus recited in claim 9 wherein said supporting means comprises a base having a V-shaped notch.

12. The apparatus recited in claim 11 wherein said base comprises a carton having a V-shaped cut out.

13. The apparatus recited in claim 9 wherein the joining panels of said one edge on which said bag is supported are inclined approximately 45° from horizontal.

14. Apparatus adapted for popping popcorn kernels in a microwave oven by irradiation of microwave energy, comprising:
    a disposable folded package having two opposing face panels and two intermediate opposing pleated side panels wherein each of said face panels is joined to each of said pleated side panels along respective edges and, when said package is unfolded, elongated trough-like regions of restricted volume are formed close to said edges in the dihedral angles formed between respective joined face and side panels, said package holding unpopped kernels and being sealed; and
    means for continuously supporting one of said face panels at an inclined angle with the lower edge of said inclined panel being the lower most portion of said package wherein, as said package is irradiated with said microwave energy and some of said kernels pop, said package inflates and unfolds from popping pressure to position the corresponding side panel of said lower edge at an inclined angle to form one of said elongated trough-like regions of restricted volume horizontally on the underside of said package wherein unpopped kernels form in a clump in said underside region and unpopped kernels disturbed from the clump by popping kernels are directed back to the clump.

15. A method of popping popcorn using microwave energy, comprising the steps of:
    providing a folded bag having a bottom and four side panels joined to adjacent ones of said side panels along edges wherein, in an unfolded state, said bag has a substantially rectangular cross section with parallel trough-like regions along said edges, said bag being sealed and holding a charge of popcorn kernels;

supporting said bag on one of said edges with a joining side panel of said one edge being inclined at an angle; and irradiating said bag with microwave energy to pop said popcorn kernels wherein, as kernels begin to pop, said bag unfolds and forms one of said trough-like regions as the lower most portion of said bag to form unpopped kernels into a clump.

16. A method of popping popcorn using microwave energy, comprising the steps of:

providing a foldable bag having a bottom and four side panels joined to adjacent ones of said side panels and said bottom along edges wherein, in an unfolded state, said bag has a substantially rectangular cross section with trough-like regions of restricted volume formed between said bottom and said side panels;

supporting said bag on one of said edges with a joining side panel of said one edge being inclined at an angle; and irradiating said bag with microwave energy to pop said popcorn kernels wherein, as kernels pop, said bag unfolds and forms one of said trough-like regions as the lower-most portion of said bag to form unpopped kernels into a clump.

17. A method of popping popcorn in a microwave oven, comprising the steps of:

placing popcorn kernels in a package having a bottom and four side panels each joined with adjacent ones of said side panels along edges, said container having a substantially rectangular cross section wherein joining side panels form trough-like regions along said edges;

sealing said package;

supporting said package on one of said edges to form said kernels into a clump along said one edge;

irradiating said package with microwave energy to heat and thereby pop said kernels; and maintaining the trough-like region corresponding to said one of said edges as the lower most portion of said bag to direct unpopped kernels distributed from the clump by popping kernels back to the clump.

18. The method recited in claim 17 wherein said package is foldable, said method further comprising the step of folding said package before said irradiating step wherein, as kernels pop, internal pressure is generated thereby inflating and unfolding said package to form said trough-like region as the lower most region of said container.

19. The method of claim 17 wherein said sealing step comprises the step of connecting two opposing ones of said side panels with an adhesive.

* * * * *